US012164263B2

(12) United States Patent
Noda et al.

(10) Patent No.: US 12,164,263 B2
(45) Date of Patent: Dec. 10, 2024

(54) TONER CARTRIDGE INCLUDING MEMORY HOLDER COVER HAVING PAWL ENGAGED WITH HOOK OF GEAR COVER

(71) Applicant: BROTHER KOGYO KABUSHIKI KAISHA, Nagoya (JP)

(72) Inventors: Ryuji Noda, Toyokawa (JP); Keita Shimizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/068,668

(22) Filed: Dec. 20, 2022

(65) Prior Publication Data

US 2023/0205132 A1 Jun. 29, 2023

(30) Foreign Application Priority Data

Dec. 23, 2021 (JP) ................................ 2021-208999

(51) Int. Cl.

| | |
|---|---|
| ***G03G 21/18*** | (2006.01) |
| ***G03G 15/08*** | (2006.01) |
| ***G03G 21/16*** | (2006.01) |

(52) U.S. Cl.

CPC ..... *G03G 21/1885* (2013.01); *G03G 15/0863* (2013.01); *G03G 21/1647* (2013.01); *G03G 21/1821* (2013.01); *G03G 2221/1823* (2013.01)

(58) Field of Classification Search

CPC ........... G03G 21/1885; G03G 21/1647; G03G 21/1821; G03G 21/1882; G03G 21/1878; G03G 2215/0697; G03G 2221/1823; G03G 15/0863

See application file for complete search history.

(56) References Cited

U.S. PATENT DOCUMENTS

| | | | | |
|---|---|---|---|---|
| 2017/0185001 A1 | 6/2017 | Itabashi et al. | |
| 2020/0310291 A1* | 10/2020 | Itabashi ............ | G03G 21/1676 |
| 2021/0149335 A1* | 5/2021 | Fujiwara ............ | G03G 21/1871 |
| 2021/0181672 A1* | 6/2021 | Ogawa ............... | G03G 21/1878 |
| 2021/0311411 A1 | 10/2021 | Kusuda et al. | |

FOREIGN PATENT DOCUMENTS

| | | |
|---|---|---|
| JP | 2017-116827 A | 6/2017 |
| JP | 2021-162750 A | 10/2021 |

* cited by examiner

*Primary Examiner* — Joseph S Wong
(74) *Attorney, Agent, or Firm* — Merchant & Gould P.C.

(57) ABSTRACT

A toner cartridge includes: a toner casing configured to accommodate toner therein; a toner memory; a memory holder holding the toner memory; a memory holder cover; a gear positioned at an outer surface of the toner casing; and a gear cover. The memory holder cover movably holds the memory holder. The memory holder cover has a pawl. The gear cover is positioned at one end portion of the toner casing at one side in a first direction. The gear cover covers at least a part of the gear and has a hook in which the pawl is inserted.

6 Claims, 13 Drawing Sheets

TONER CARTRIDGE INCLUDING MEMORY HOLDER COVER HAVING PAWL ENGAGED WITH HOOK OF GEAR COVER

REFERENCE TO RELATED APPLICATIONS

This application claims priority from Japanese Patent Application No. 2021-208999 filed on Dec. 23, 2021. The entire content of the priority application is incorporated herein by reference.

BACKGROUND ART

There has been known a toner cartridge including a memory. The toner cartridge includes a memory holder holding the memory, and a holder cover by which the memory holder is movably held. The holder cover is fixed to a gear cover covering a gear by two screws extending from an inner surface of the gear cover into the holder cover.

DESCRIPTION

In the above-described conventional toner cartridge, assembly of the memory holder is a troublesome task.

In view of the foregoing, it is an object of the disclosure to provide a toner cartridge capable of facilitating assembly of the memory holder holding the toner memory.

In order to attain the above and other object, the present disclosure provides a toner cartridge including a toner casing, a toner memory a memory holder, a memory holder cover, a gear, and a gear cover. The toner casing is configured to accommodate toner therein. The memory holder holds the toner memory. The memory holder cover movably holds the memory holder. The memory holder cover has a pawl. The gear is positioned at an outer surface of the toner casing. The gear cover is positioned at one end portion of the toner casing in a first direction. The gear cover covers at least a part of the gear and has a hook in which the pawl is inserted.

With this structure, the memory holder cover is fixed to the gear cover by the engagement of the pawl of the memory holder cover with the gear cover. Hence, assembling work of the memory holder holding the memory can be facilitated.

Hereinafter, one embodiment of the present disclosure will be described with reference to the accompanying drawings.

Figure 1:
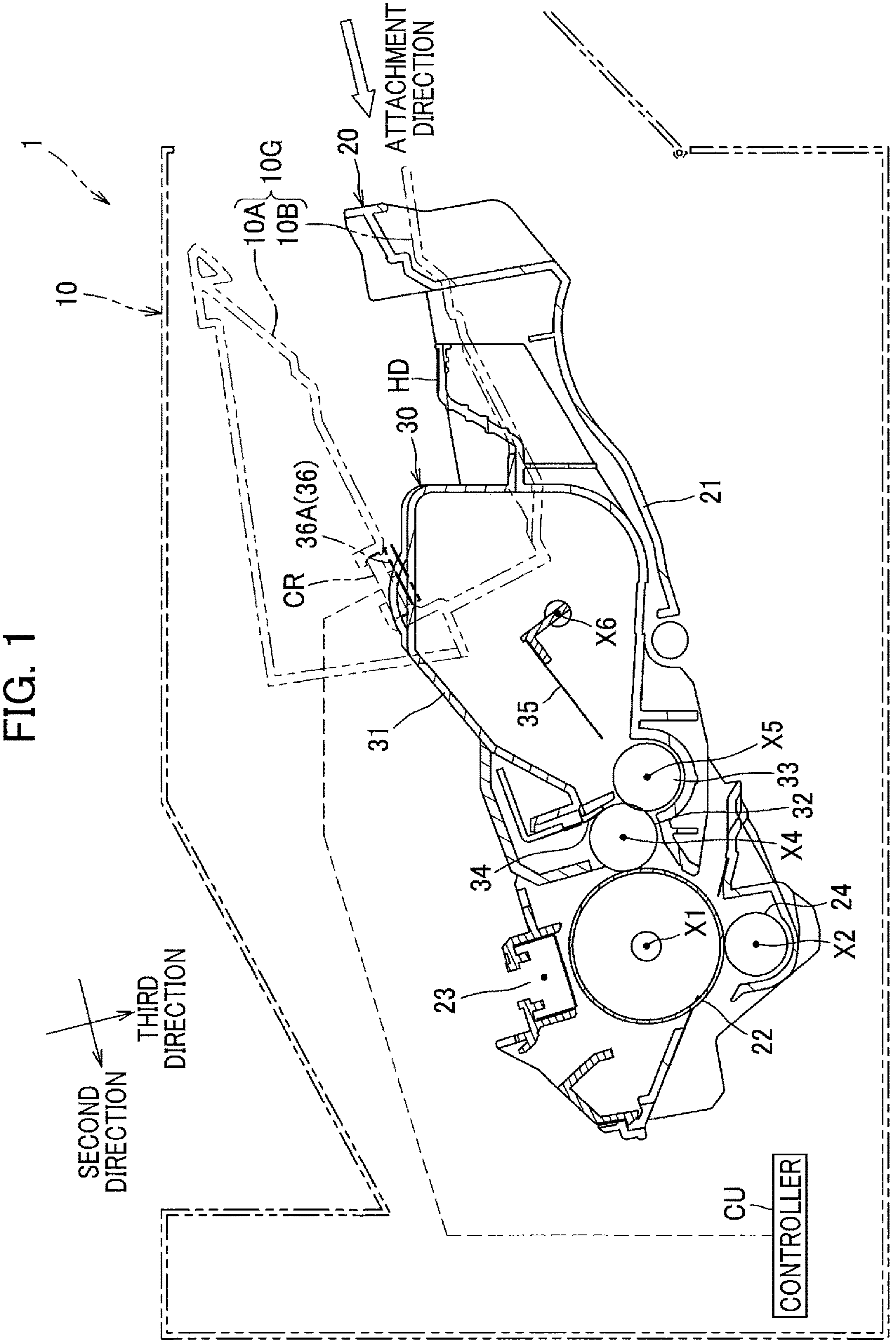
FIG. 1 is a cross-sectional view of a drum cartridge attached to an image forming apparatus.

As illustrated in FIG. 1, an image forming apparatus 1 includes a housing 10, a drum cartridge 20, a toner cartridge 30, a controller CU, and a contact relay CR.

The image forming apparatus 1 is a monochromatic printer. The drum cartridge 20 is attachable to the housing 10. The drum cartridge 20 is attached to the housing 10 in an attachment direction. The toner cartridge 30 is attachable to the drum cartridge 20. That is, in the present embodiment, the drum cartridge 20 is attached to the housing 10 in a state where the toner cartridge 30 is attached to the drum cartridge 20.

The housing 10 has a guide groove 10G configured to guide the drum cartridge 20 to an attachment position thereof. The guide groove 10G extends in the attachment direction. The guide groove 10G has an upper guide surface 10A and a lower guide surface 10B. The upper guide surface 10A extends above and along an attachment path of the drum cartridge 20. The lower guide surface 10B extends below and along the attachment path.

The controller CU includes a CPU and the like. The controller CU is configured to provide control over printing. The controller CU is configured to communicate with a toner memory 36 (described later) of the toner cartridge 30 in a state where the drum cartridge 20 is attached to the housing 10. The toner memory 36 has an electrical contact surface 36A. The contact relay CR is configured to contact the electrical contact surface 36A in the state where the drum cartridge 20 is attached to the housing 10. The controller CU is configured to communicate with the toner memory 36 through the contact relay CR.

Figure 2:
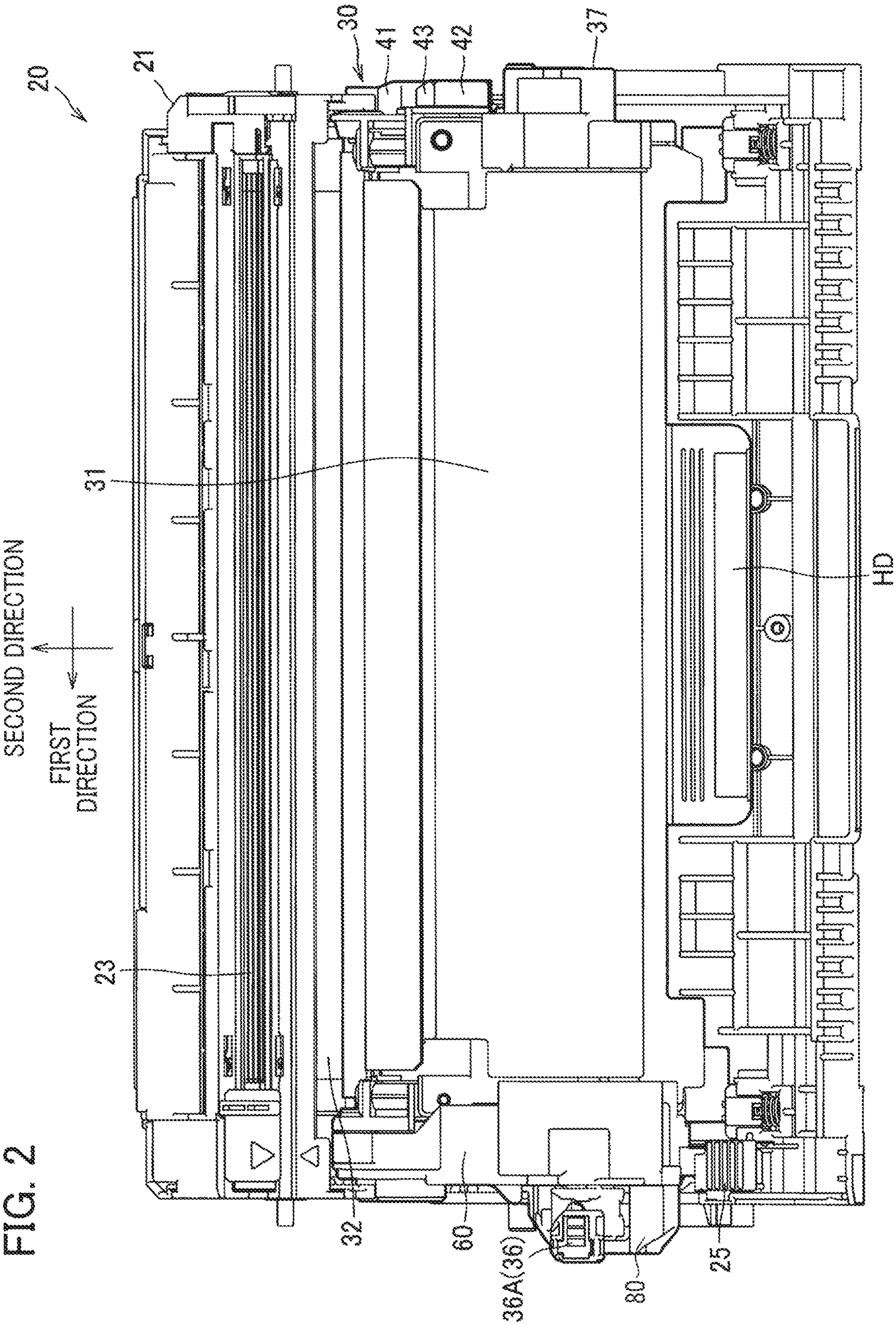
FIG. 2 is a plan view of the drum cartridge.

As illustrated in FIGS. 1 and 2, the drum cartridge 20 includes a drum frame 21, a photosensitive drum 22, a charger 23, a transfer roller 24, and a lock lever 25.

The drum frame 21 is a frame covering the drum cartridge 20. The drum frame 21 rotatably supports the photosensitive drum 22 and the transfer roller 24. The drum frame 21 has a guide groove 21A (see FIG. 3A) configured to guide the toner cartridge 30 for attachment of the toner cartridge 30 to the drum cartridge 20.

The photosensitive drum 22 is rotatable about a drum axis X1 extending in a first direction. In the present disclosure, the first direction is an extending direction of the drum axis X1 that is a rotation axis of the photosensitive drum 22. In the following description, a direction crossing the first direction will be referred to as a "second direction". In the present embodiment, the second direction is perpendicular to the first direction. Further, the second direction is coincident with the attachment direction of the drum cartridge 20. Further, a direction crossing the first direction and the second direction will be referred to as a "third direction".

The charger 23 is configured to charge the photosensitive drum 22. The charger 23 is a Scorotron charger positioned apart from the photosensitive drum 22.

The transfer roller 24 is configured to transfer toner on the photosensitive drum 22 to a sheet (not illustrated). The transfer roller 24 is rotatable about a transfer roller axis X2 extending in the first direction. The transfer roller 24 is in contact with the photosensitive drum 22.

The lock lever 25 is configured to lock the toner cartridge 30 to the drum frame 21 upon attachment of the toner cartridge 30 to the drum cartridge 20. The lock lever 25 is positioned at one end portion of the drum cartridge 20 in the first direction (i.e., at a left end portion in FIG. 2). In the following description, with respect to each direction indicated by arrows in each drawing, a leading end side of each arrow will be referred to as "one side" or "one end portion", and a trailing end side of each arrow in each drawing (which is opposite to the "one side" or the "one end portion") will be referred to as "another side" or "another end portion".

Figure 3A:
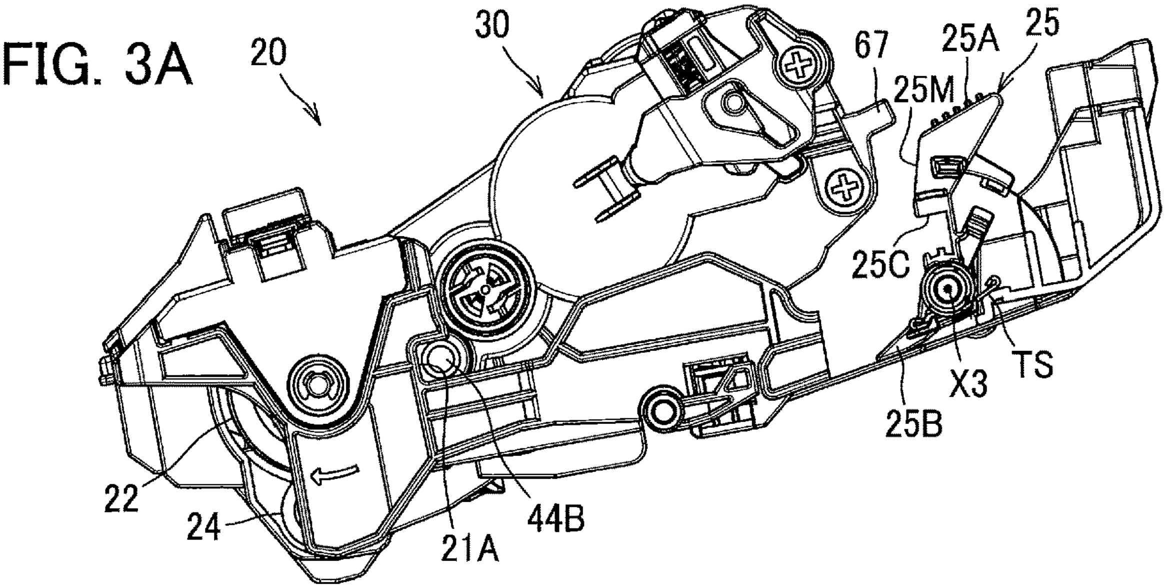
FIG. 3A is a view for description of attachment of a toner cartridge to the drum cartridge, and particularly illustrating a state prior to attachment of the toner cartridge to the drum cartridge.

As illustrated in FIG. 3A, the lock lever 25 is pivotally movable about a lock lever axis X3 extending in the first direction. The lock lever 25 is pivotally movable between a locking position illustrated in FIG. 3C and an unlocking position illustrated in FIG. 4C. The lock lever 25 functions to lock the toner cartridge 30 to the drum frame 21 when the lock lever 25 is at the locking position. On the other hand, at the unlocking position, the lock lever 25 unlocks the toner cartridge 30 from the drum frame 21.

The lock lever 25 includes an operating portion 25A, a lifter portion 25B, a locking portion 25C, and a torsion spring TS. Incidentally, in FIGS. 3A through 4C, a portion of the drum frame 21 and a handle HD of the toner cartridge 30 are not illustrated to facilitate understanding of drawings.

The operating portion 25A is positioned apart from the lock lever axis X3 by a predetermined distance. The operating portion 25A is exposed on an outer surface of the drum cartridge 20. The operating portion 25A is configured to be operated by a user.

The lifter portion 25B is positioned opposite to the operating portion 25A with respect to the lock lever axis X3. The lifter portion 25B extends from the lock lever axis X3 in a direction away from the operating portion 25A. The lifter portion 25B is configured to contact the toner cartridge 30 and lift the toner cartridge 30 upward in response to user's depression of the operating portion 25A.

The locking portion 25C is positioned between the operating portion 25A and the lifter portion 25B. The locking portion 25C is a recessed portion configured to allow insertion of a portion of the toner cartridge 30 therein to lock the toner cartridge 30. Specifically, a locking protrusion 67 (described later, see FIGS. 6 and 8) of a gear cover 60 (described later, see FIGS. 6 and 8) of the toner cartridge 30 is configured to be inserted in the locking portion 25C. The torsion spring TS normally urges the lock lever 25 from the unlocking position toward the locking position.

As illustrated in FIGS. 1 and 2, the toner cartridge 30 includes a toner casing 31, a developing roller 32, a supply roller 33, a layer thickness regulation blade 34, an agitator 35, the toner memory 36, and the handle HD.

The toner casing 31 is configured to accommodate toner therein.

The developing roller 32 is configured to supply the toner to the photosensitive drum 22. The developing roller 32 is rotatable about a developing roller axis X4 extending in the first direction. The developing roller 32 is positioned at one end portion of the toner casing 31 at one side in the second direction.

The supply roller 33 is configured to supply the toner in the toner casing 31 to the developing roller 32. The supply roller 33 is rotatable about a supply roller axis X5 extending in the first direction.

The layer thickness regulation blade 34 is configured to regulate a thickness of a toner layer formed on the developing roller 32. The layer thickness regulation blade 34 is in contact with the developing roller 32.

The agitator 35 is positioned inside the toner casing 31. The agitator 35 is configured to agitate the toner in the toner casing 31. The agitator 35 is also configured to supply the toner in the toner casing 31 to the supply roller 33. The agitator 35 is rotatable about an agitator axis X6 extending in the first direction.

The toner memory 36 is a storage medium configured to store data, such as an IC chip. Alternatively, a storage medium other than an IC chip may be available. The toner memory 36 is configured to store therein information about the toner cartridge 30. Here, the information about the toner cartridge 30 may be at least one of identification information and lifetime information about the toner cartridge 30. The identification information may be a serial number of the toner cartridge 30, for example. The lifetime information may be at least one of: a cumulative rotation number of the developing roller 32 or the agitator 35; a used dot count; and a residual amount of the toner, for example.

Figure 6:
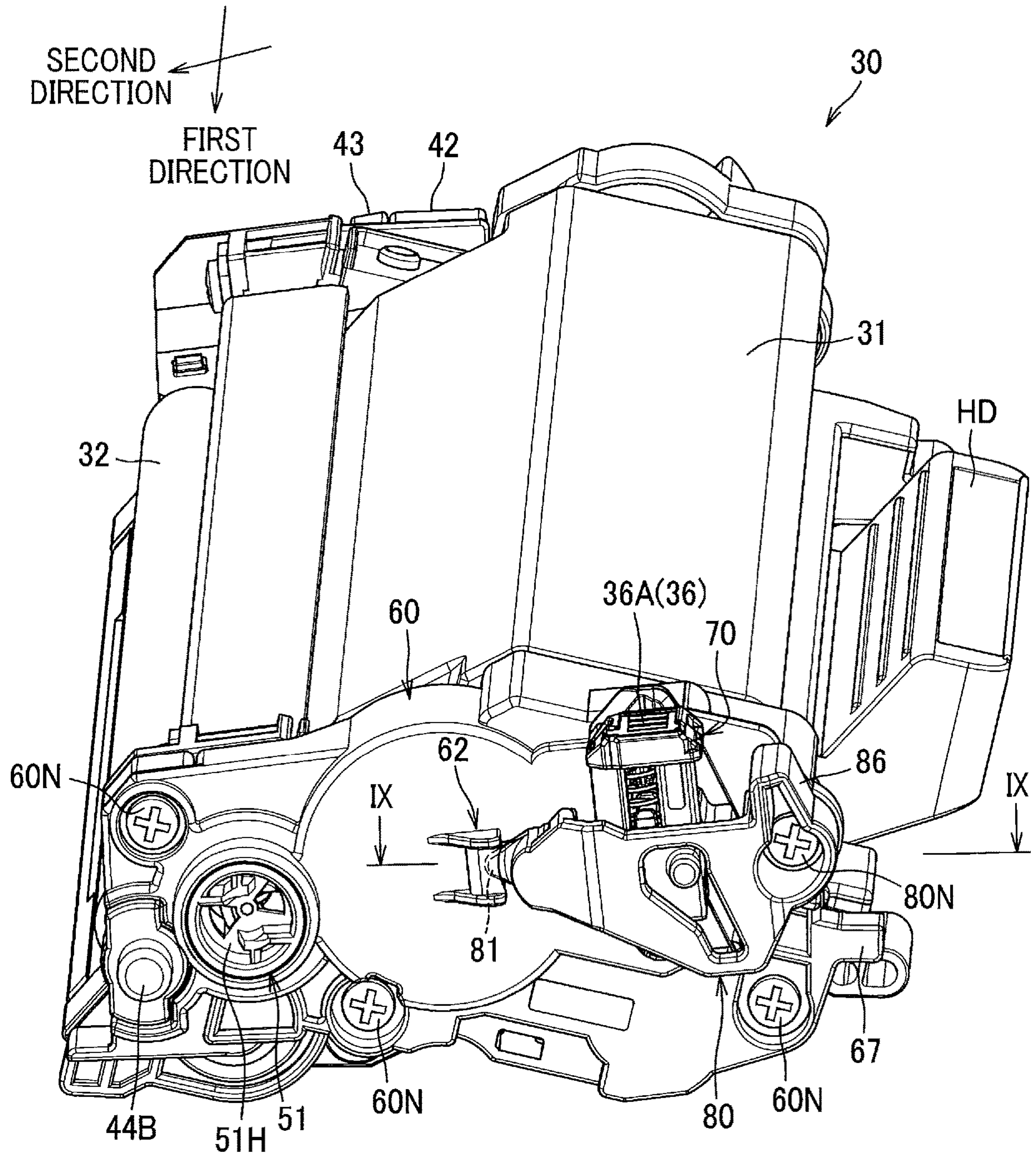
FIG. 6 is a perspective view of the toner cartridge as viewed from one side in the first direction.

The toner memory 36 has the electrical contact surface 36A (also see FIG. 6). The electrical contact surface 36A is positioned in separation from the toner casing 31. The electrical contact surface 36A extends in the second direction. The electrical contact surface 36A crosses the third direction.

The handle HD is positioned at an end portion of the toner casing 31 at another side in the second direction (also see FIG. 6). The handle HD is configured to be gripped by the user for attaching and detaching the toner cartridge 30 to and from the drum cartridge 20.

Figure 5:
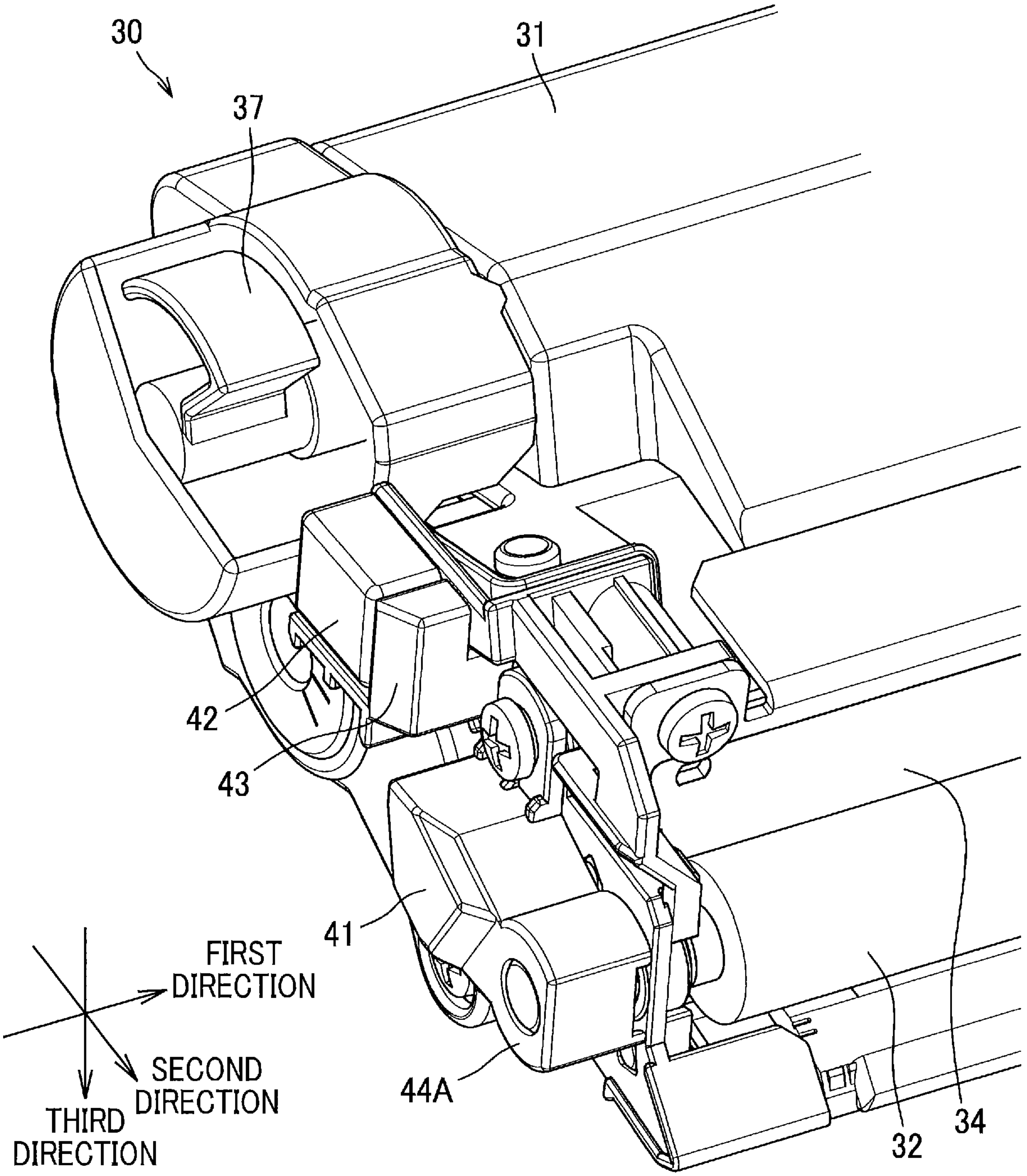
FIG. 5 is a perspective view illustrating an end portion of the toner cartridge at another side in a first direction.

As illustrated in FIG. 5, the toner cartridge 30 further includes a detection gear 37, a developing electrode 41, a supply electrode 42, an insulating member 43, and a first collar 44A which are positioned at the end portion of the toner casing 31 at another side in the first direction.

The detection gear 37 is a member configured to detect whether the drum cartridge 20 is new or not. The detection gear 37 has a well-known configuration, and rotates by a predetermined angle in a case where the drum cartridge 20 is a new cartridge, while the detection gear 37 does not rotate in a case where the drum cartridge 20 is a used cartridge. The controller CU is configured to determine whether or not the drum cartridge 20 is a new cartridge based on the rotation of the detection gear 37.

The developing electrode 41 and the supply electrode 42 are made from electrically conductive resin. The developing electrode 41 is electrically connected to the developing roller 32. The supply electrode 42 is electrically connected to the supply roller 33. The insulating member 43 is positioned between the developing electrode 41 and the supply electrode 42.

The first collar 44A covers an end portion of a rotation shaft of the developing roller 32 at the other side in the first direction. The first collar 44A is integral with the developing electrode 41.

Figure 7:
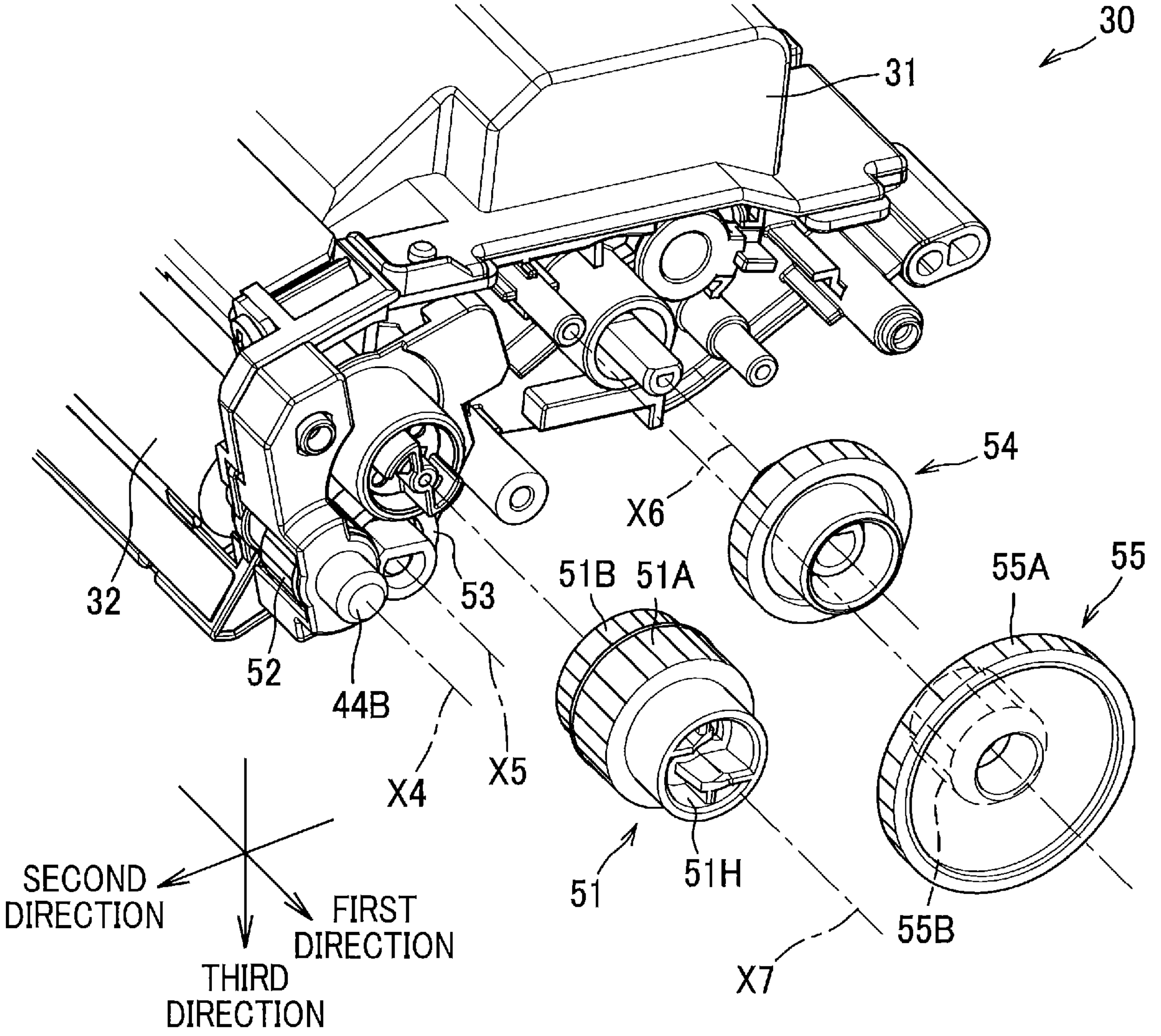
FIG. 7 is an exploded perspective view for description of layout of gears of the toner cartridge.

As illustrated in FIGS. 6 and 7, the toner cartridge 30 includes a second collar 44B, a coupling 51, a developing gear 52, a supply gear 53, an agitator gear 54, an idle gear 55, the gear cover 60, a memory holder 70, a memory holder cover 80, and a screw 80N at one end portion of the toner casing 31 at one side in the first direction. The second collar 44B, the coupling 51, the developing gear 52, the supply gear 53, the agitator gear 54, and the idle gear 55 are positioned at an outer surface of the toner casing 31.

As illustrated in FIG. 7, the second collar 44B covers one end portion of the rotation shaft of the developing roller 32 at the one side in the first direction. The second collar 44B is hollow cylindrical, and protrudes outward toward the one side in the first direction.

The coupling 51 is rotatable about a coupling axis X7 extending in the first direction. The coupling 51 is rotatable upon receipt of a driving force. The coupling 51 has a recessed portion 51H that is recessed inward in the first direction. The recessed portion 51H is configured to be engaged with a driving member (not illustrated) of the housing 10. The coupling 51 includes a large diameter gear 51A and a small diameter gear 51B.

The developing gear 52 is rotatable together with the developing roller 32. The developing gear 52 is in meshing engagement with the large diameter gear 51A of the coupling 51.

The supply gear 53 is rotatable together with the supply roller 33. The supply gear 53 is in meshing engagement with the small diameter gear 51B of the coupling 51.

The idle gear 55 includes a large diameter gear 55A and a small diameter gear 55B. The large diameter gear 55A of the idle gear 55 is in meshing engagement with the large diameter gear 51A of the coupling 51.

The agitator gear 54 is positioned at one end of the agitator 35. The agitator gear 54 is rotatable together with the agitator 35. The agitator gear 54 is in meshing engagement with the small diameter gear 55B of the idle gear 55.

As illustrated in FIGS. 6 and 7, the gear cover 60 is positioned at the one end portion of the toner casing 31 at the one side in the first direction. The gear cover 60 covers at least one of the gears positioned at the one end portion of the toner casing 31 at the one side in the first direction. In the present embodiment, the gear cover 60 covers at least a portion of the coupling 51. Further, the gear cover 60 covers the agitator gear 54 and the idle gear 55 (also see FIG. 9).

As illustrated in FIG. 6, the gear cover 60 is fixed to the toner casing 31 by a plurality of screws 60N. In the present embodiment, the gear cover 60 is fixed to the toner casing 31 by the screws 60N that are inserted from an outer surface of the gear cover 60.

Figure 8:
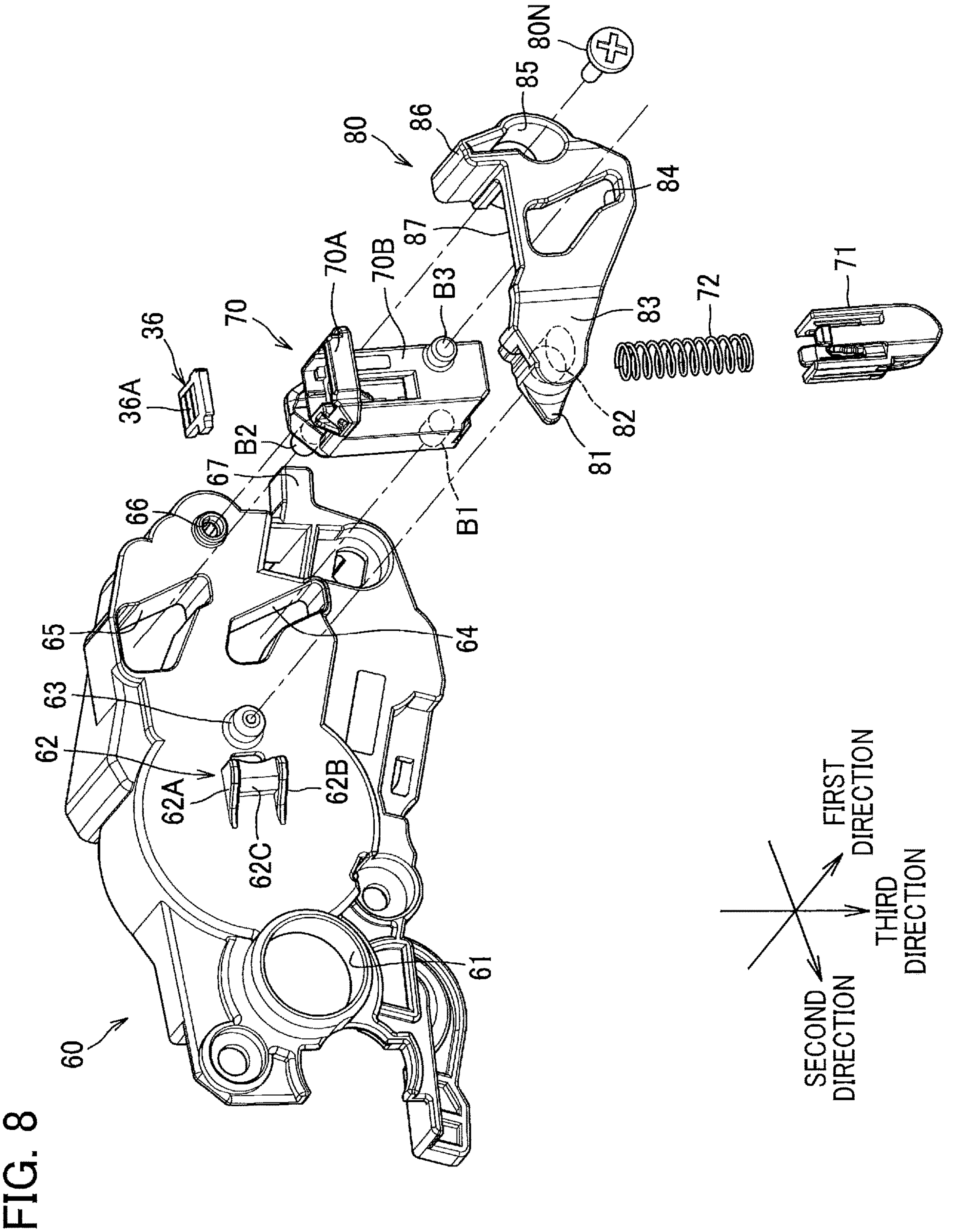
FIG. 8 is a perspective view illustrating a gear cover, a memory holder, and a memory holder cover of the toner cartridge.

As illustrated in FIG. 8, the gear cover 60 has a coupling hole 61, a hook 62, a boss 63, a first elongated slot 64, a second elongated slot 65, a screw hole 66, and the locking protrusion 67.

The coupling hole 61 is positioned at one end portion of the gear cover 60 at the one side in the first direction. Through the coupling hole 61, the coupling 51 is exposed to the outside.

Figure 9:
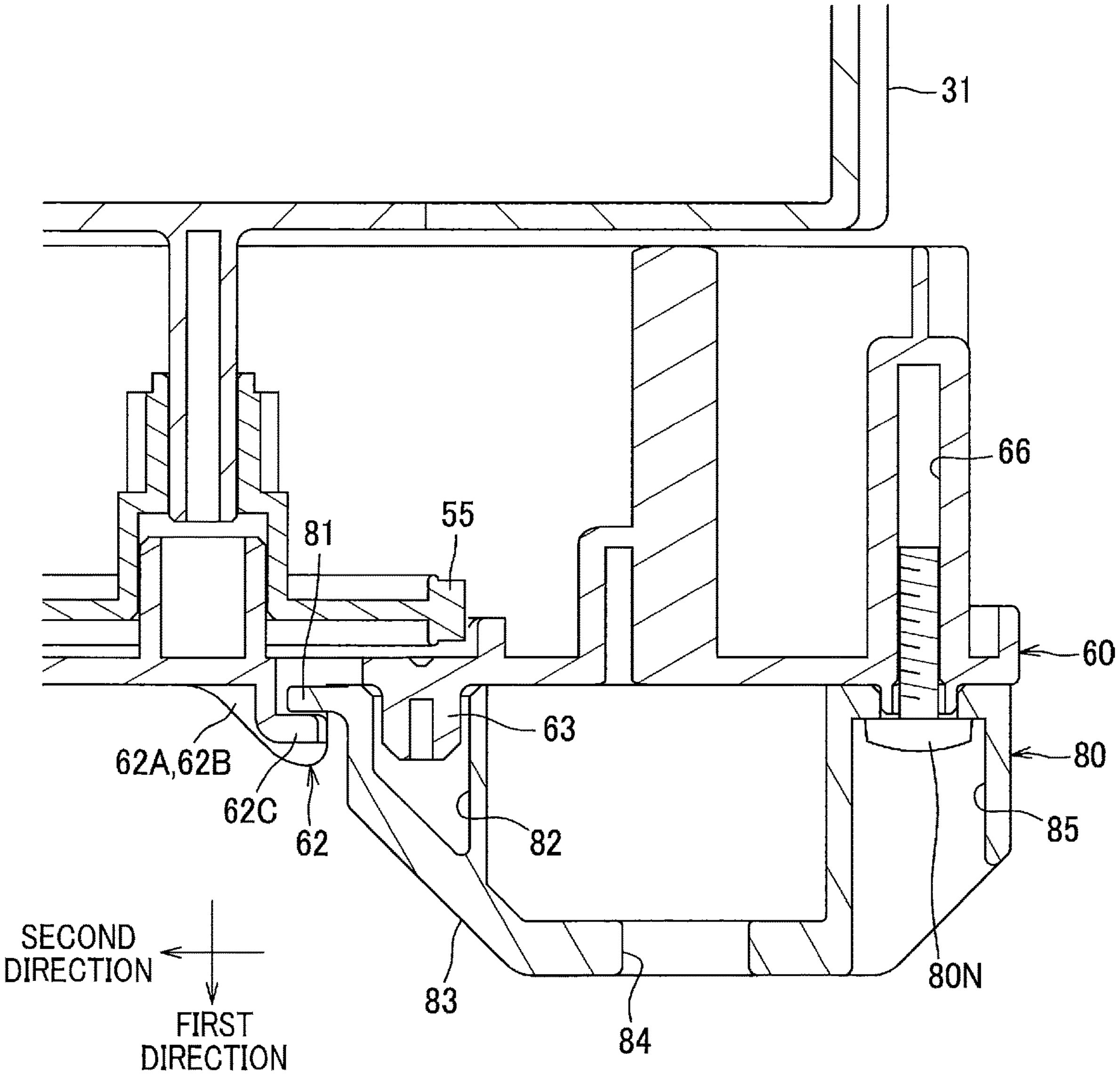
FIG. 9 is a cross-sectional view taken along a line IX-IX in FIG. 6 for description of fixing of the memory holder cover to the gear cover.

As illustrated in FIG. 9, the hook 62 is positioned at the outer surface of the gear cover 60. The hook 62 protrudes from the outer surface toward the one side in the first direction. The hook 62 is open toward the other side in the second direction. A pawl 81 (described later) of the memory holder cover 80 is inserted in the opening of the hook 62 from the other side in the second direction, so that the pawl 81 is engaged with the hook 62 to restrict detachment of the memory holder cover 80 from the gear cover 60 toward the one side in the second direction. As illustrated in FIG. 8, the hook 62 includes a first rib 62A, a second rib 62B, and a connecting portion 62C.

The first rib 62A protrudes toward the one side in the first direction. The first rib 62A extends in the second direction. The first rib 62A has an inclined shape whose protruding length in the first direction increases toward the one side in the first direction as extending toward the other side in the second direction. The second rib 62B protrudes toward the one side in the first direction.

The second rib 62B extends in the second direction. The second rib 62B has an inclined shape whose protruding length in the first direction increases toward the one side in the first direction as extending toward the other side in the second direction. The second rib 62B is positioned apart from the first rib 62A in the third direction crossing the first direction.

The connecting portion 62C connects the first rib 62A and the second rib 62B together. The connecting portion 62C extends in the third direction.

The boss 63 is positioned at the outer surface of the gear cover 60. The boss 63 protrudes toward the one side (outward) in the first direction. The boss 63 is positioned between the hook 62 and the screw hole 66.

The first elongated slot 64 and the second elongated slot 65 are elongated in the third direction. Each of the first elongated slot 64 and the second elongated slot 65 defines a dimension in the second direction that is decreased toward one side in the third direction. In other words, the dimension in the second direction of each the first elongated slot 64 and the second elongated slot 65 is increased toward another side in the third direction. The first elongated slot 64 is positioned further toward the one side relative to the second elongated slot 65 in the third direction.

The screw hole 66 is positioned at an end portion of the gear cover 60 at the other side in the second direction. The screw hole 66 is a hole into which the screw 80N is to be inserted to fix the memory holder cover 80 to the gear cover 60.

The locking protrusion 67 is positioned at the end portion of the gear cover 60 at the other side in the second direction. The locking protrusion 67 protrudes toward the other side in the third direction.

The memory holder 70 holds the toner memory 36. The memory holder 70 holds the toner memory 36 such that the electrical contact surface 36A is movable relative to the toner casing 31.

The memory holder 70 includes a base 70A, a tubular portion 70B, a first boss B1, a second boss B2, and a third boss B3. The base 70A holds the toner memory 36. The base 70A protrudes from the tubular portion 70B toward the one side in the first direction.

The tubular portion 70B has a rectangular hollow cylindrical shape. The tubular portion 70B extends from the base 70A in a direction away from the toner memory 36. The first boss B1 and the second boss B2 respectively protrude from the tubular portion 70B toward the other side in the first direction, i.e., toward the gear cover 60. The first boss B1 is inserted in the first elongated slot 64. The second boss B2 is positioned apart from the first boss B1 by a predetermined distance toward the other side in the third direction. The second boss B2 is inserted in the second elongated slot 65. The third boss B3 protrudes from the tubular portion 70B toward the one side in the first direction. The third boss B3 is inserted in a third elongated slot 84 (described later) of the memory holder cover 80.

Figure 10A:
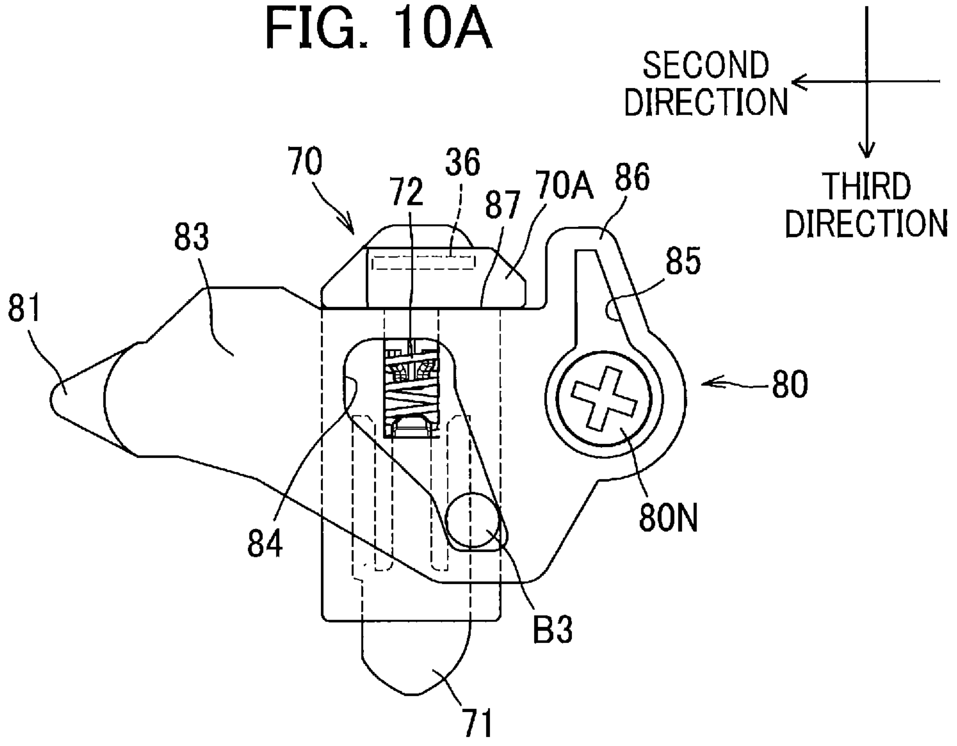
FIG. 10A is a view for description of movement of the memory holder held by the memory holder cover, and particularly illustrating a state where the memory holder is at a first position.

To the memory holder 70, a spring retainer 71 and a spring 72 are attached. As illustrated in FIG. 10A, the spring retainer 71 is positioned inside the tubular portion 70B. The spring retainer 71 is held slidably relative to the inside of the memory holder 70. The spring retainer 71 is slidable in the third direction relative to the memory holder 70. The spring 72 is positioned between the memory holder 70 and the spring retainer 71. The spring 72 extends in the third direction. The spring 72 is a coil spring. The spring 72 urges the spring retainer 71 in a direction away from the toner memory 36.

As illustrated in FIG. 8, the memory holder cover 80 movably holds the memory holder 70. As illustrated in FIG. 2, at least a portion of the memory holder cover 80 is positioned farther away from the outer surface of the toner casing 31 in the first direction than the lock lever 25 is from the outer surface. That is, the memory holder cover 80 protrudes further toward the one side in the first direction relative to the lock lever 25.

As illustrated in FIG. 8, the memory holder cover 80 is fixed to the gear cover 60 by the screw 80N in a state where the pawl 81 is received in the hook 62 of the gear cover 60 (also see FIG. 9). The memory holder cover 80 has the pawl 81, a boss hole 82, a sloped surface 83, the third elongated slot 84, a screw hole 85, a protrusion 86, and a holding surface 87.

The pawl 81 is positioned at one end portion of the memory holder cover 80 at the one side in the second direction. The pawl 81 has a triangular shape having a rounded apex. The pawl 81 has a dimension in the third direction that is decreased toward the one side in the second direction. The pawl 81 is inserted in the hook 62 and is in contact with the connecting portion 62C of the hook 62 in a state where the memory holder cover 80 is fixed to the gear cover 60.

The boss hole 82 is a hole in which the boss 63 of the gear cover 60 is inserted.

The sloped surface 83 is positioned at one end portion of the memory holder cover 80 at the one side in the second direction. The sloped surface 83 is positioned between the pawl 81 and the third elongated slot 84 in the second direction. The sloped surface 83 is sloped to protrude further toward the one side (outward) in the first direction as extending away from the developing roller 32.

The third elongated slot 84 is elongated in the third direction. The third elongated slot 84 has a dimension in the second direction that is decreased toward the one side in the third direction. In other words, the dimension in the second direction of the third elongated slot 84 is increased toward the other side in the third direction. The third boss B3 of the memory holder 70 is inserted in the third elongated slot 84.

As illustrated in FIG. 9, the screw hole 85 is a hole in which the screw 80N is inserted. The screw 80N is inserted from the one side in the first direction with respect to the gear cover 60. That is, the screw 80N is inserted from the outer surface of the gear cover 60. The pawl 81, the screw 80N, and the boss hole 82 are arrayed with one another in a state where the screw 80N is inserted in the screw hole 85.

As illustrated in FIG. 8, the protrusion 86 is positioned at an end portion of the memory holder cover 80 at the other side in the second direction. The protrusion 86 is positioned farther away from the developing roller 32 than the pawl 81 is from the developing roller 32 in the second direction. The protrusion 86 protrudes in the third direction crossing the first direction. In the present embodiment, the protrusion 86 protrudes toward the other side in the third direction.

The holding surface 87 is a surface perpendicular to the third direction and positioned at the other end portion of the memory holder cover 80 in the third direction. The holding surface 87 is configured to hold the base 70A of the memory holder 70.

Figure 10B:
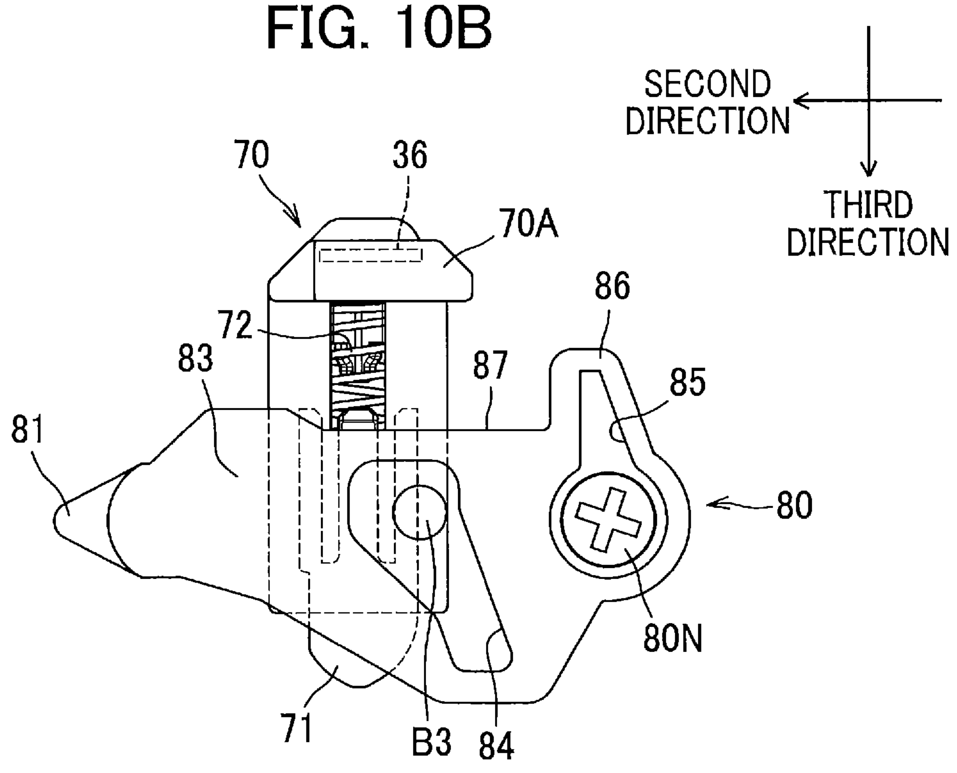
FIG. 10B is a view for description of the movement of the memory holder held by the memory holder cover, and particularly illustrating a state where the memory holder is at a second position.

With the memory holder 70 having the above-described configuration, the memory holder 70 is movable relative to the toner casing 31 in the second direction as well as in the third direction, as illustrated in FIGS. 10A and 10B. Specifically, the memory holder 70 is movable between a first position illustrated in FIG. 10A and a second position illustrated in FIG. 10B.

As illustrated in FIG. 10A, the memory holder 70 is at the first position in a case where the toner cartridge 30 is detached from the housing 10 of the image forming apparatus 1. Specifically, in the state where the memory holder 70 is at the first position, the base 70A of the memory holder 70 is in contact with the holding surface 87 of the memory holder cover 80.

As illustrated in FIG. 10B, the memory holder 70 is at the second position in a case where the drum cartridge 20 with the toner cartridge 30 attached thereto is attached to the housing 10 of the image forming apparatus 1. Upon attachment of the toner cartridge 30 to the drum cartridge 20, the spring retainer 71 is urged toward the other side in the third direction (upward in FIG. 10) by the lower guide surface 10B of the housing 10 (see FIGS. 11 through 13).

In the state where the memory holder 70 is at the second position, the electrical contact surface 36A of the toner memory 36 is positioned further toward the other side in the third direction (upward in FIG. 10) than in the state where the memory holder 70 is at the first position. Further, in the state where the memory holder 70 is at the second position, the electrical contact surface 36A of the toner memory 36 is positioned further toward the one side in the second direction than in the case where the memory holder 70 is at the first position. In the state where the memory holder 70 is at the second position, the toner memory 36 is urged toward the contact relay CR of the housing 10 by the urging force of the spring 72 such that the toner memory 36 is in contact with the contact relay CR (see FIG. 1).

Next, a process to attach the toner cartridge 30 to the drum cartridge 20 will be described with reference to FIGS. 3A through 3C.

As illustrated in FIG. 3A, in a state where the toner cartridge 30 is detached from the drum cartridge 20, the lock lever 25 is at the locking position due to the urging force of the torsion spring TS. For attaching the toner cartridge 30 to the drum cartridge 20, the first collar 44A and the second collar 44B of the developing roller 32 are inserted in the guide groove 21A of the drum frame 21.

Figure 3B:
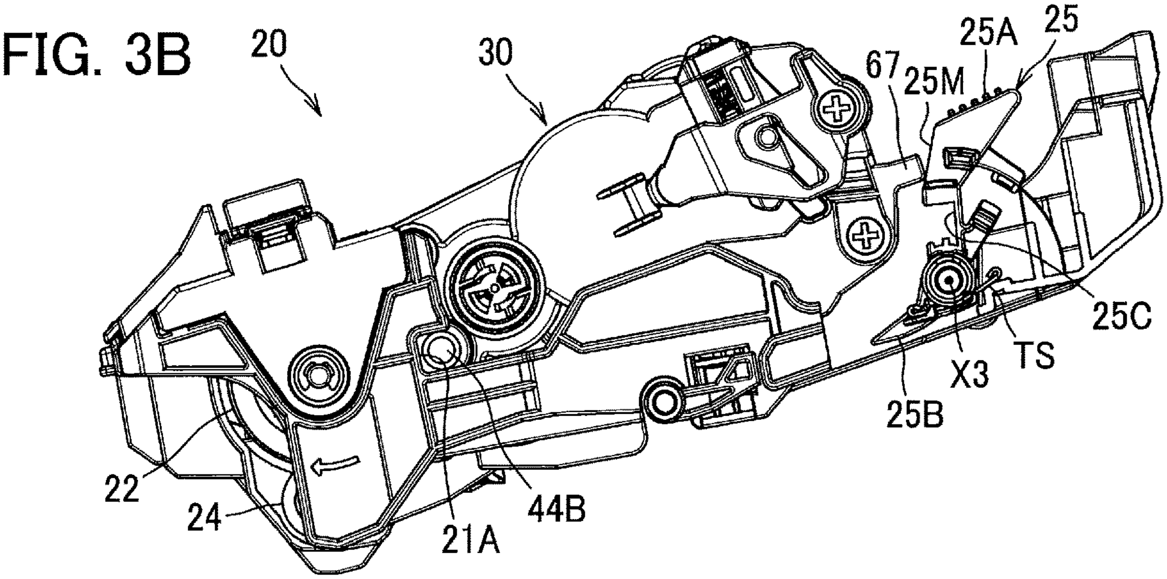
FIG. 3B is a view for description of the attachment of the toner cartridge to the drum cartridge, and particularly illustrating a state where the toner cartridge is slightly lifted up from its attachment position.
Figure 3C:
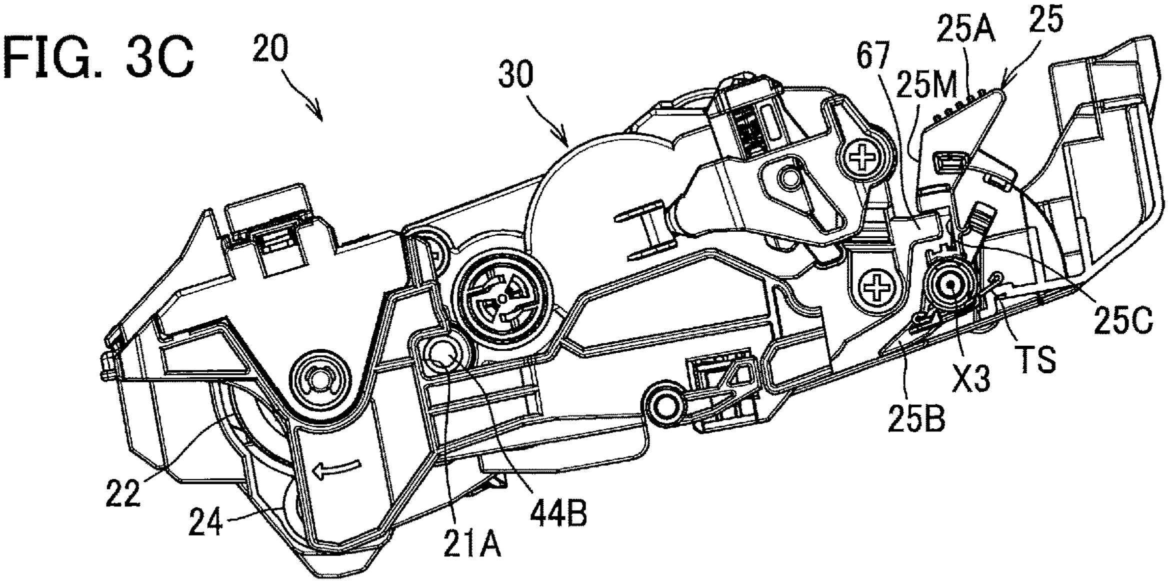
FIG. 3C is a view for description of the attachment of the toner cartridge to the drum cartridge, and particularly illustrating a state where the toner cartridge is at its attachment position.

Next, as illustrated in FIG. 3B, the toner cartridge 30 is pivotally moved toward the drum frame 21 about axes of the first collar 44A and the second collar 44B. Accordingly, the locking protrusion 67 is brought into contact with an abutment surface 25M of the lock lever 25. At this time, the locking protrusion 67 applies pressure to the abutment surface 25M, so that the lock lever 25 is pivotally moved from the locking position toward the unlocking position. In the state illustrated in FIG. 3B, the toner cartridge 30 is still lifted up relative to the drum frame 21, and the toner cartridge 30 is unlocked by the lock lever 25. In other words, the lock lever 25 is at the unlocking position in a case where the toner cartridge 30 is lifted up from the drum frame 21. In the following description, the state where the toner cartridge 30 is lifted up from the drum frame 21 will be referred to as "half-insertion state" wherever appropriate.

Subsequently, as the toner cartridge 30 is brought further closer to the drum frame 21 from the lifted-up state (from the half-insertion state) illustrated in FIG. 3B, the toner cartridge 30 is moved to an attached position thereof illustrated in FIG. 3C. Upon arrival of the toner cartridge 30 at the attached position, the locking protrusion 67 enters the locking portion 25C, so that the lock lever 25 is pivotally moved from the unlocking position to the locking position by the urging force of the torsion spring TS. In this way, the lock lever 25 moves to the locking position upon attachment of the toner cartridge 30 to the drum cartridge 20. In a case where the lock lever 25 is at the locking position, the locking protrusion 67 contacts an upper surface of the locking portion 25C to restrict the locking protrusion 67 from moving upward relative to the drum frame 21. The toner cartridge 30 thus cannot be detached from the drum cartridge 20 in the state where the lock lever 25 is at the locking position.

Figure 4A:
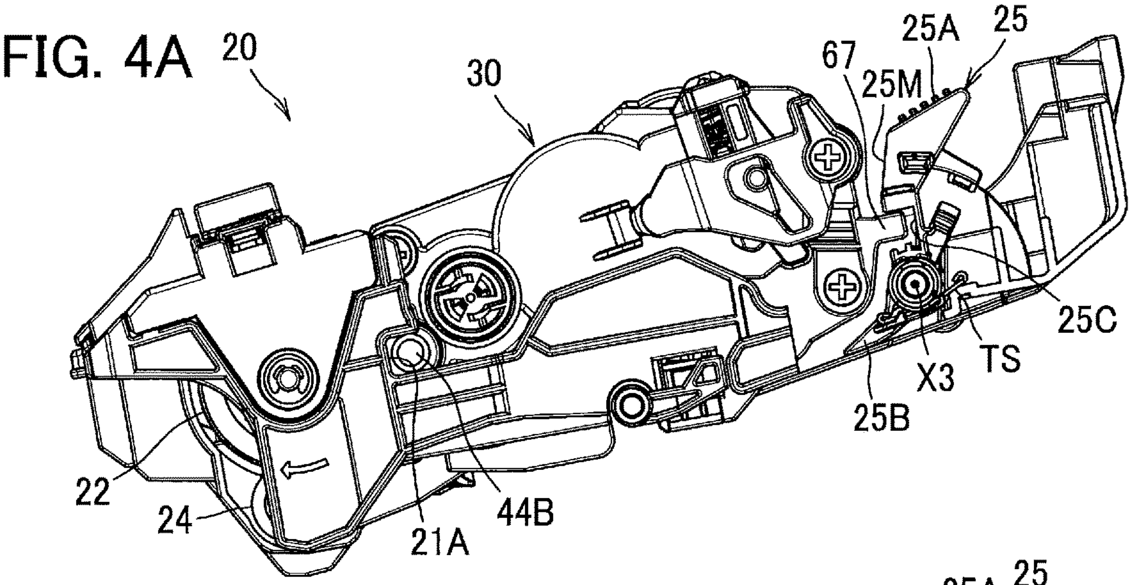
FIG. 4A is a view for description of detachment of the toner cartridge from the drum cartridge, and particularly illustrating the state where the toner cartridge is at its attachment position.
Figure 4B:
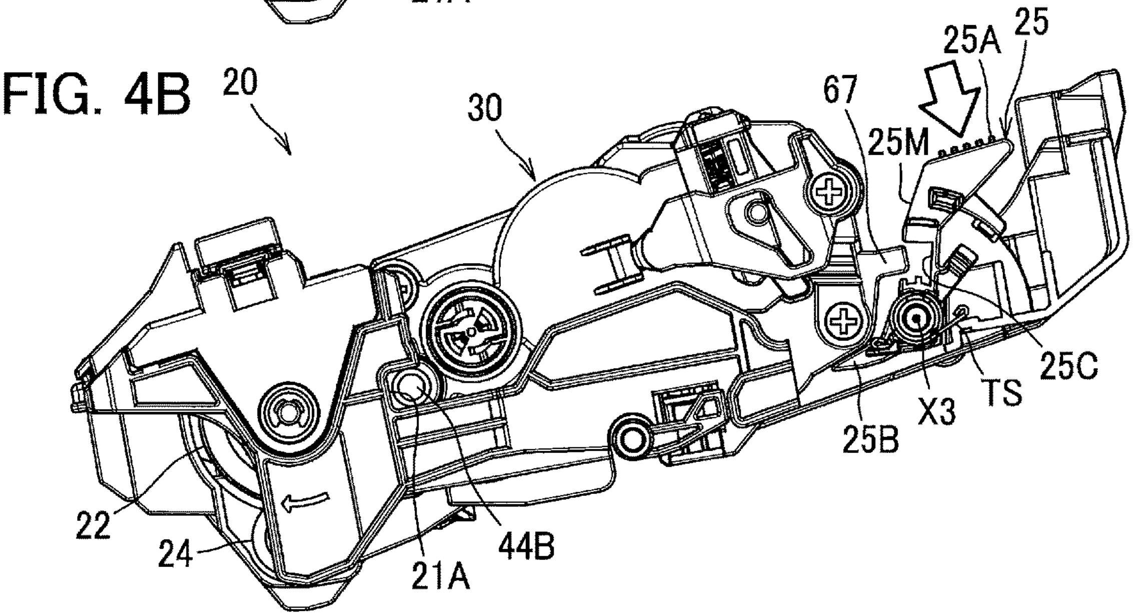
FIG. 4B is a view for description of the detachment of the toner cartridge from the drum cartridge, and particularly illustrating a state where the toner cartridge is unlocked from the drum cartridge.

Next, a process to detach the toner cartridge 30 from the drum cartridge 20 will be described with reference to FIGS. 4A through 4C.

For detaching the toner cartridge 30 from the drum cartridge 20, the operating portion 25A of the lock lever 25 at the locking position (illustrated in FIG. 4A) is depressed downward. As the operating portion 25A is depressed downward, the lock lever 25 is moved from the locking position to the unlocking position illustrated in FIG. 4B. As the lock lever 25 moves to the unlocking position, the locking protrusion 67 is separated away from the upper surface of the locking portion 25C to bring the locking protrusion 67 into a position outside of the locking portion 25C. As a result, the toner cartridge 30 becomes detachable from the drum frame 21.

Figure 4C:
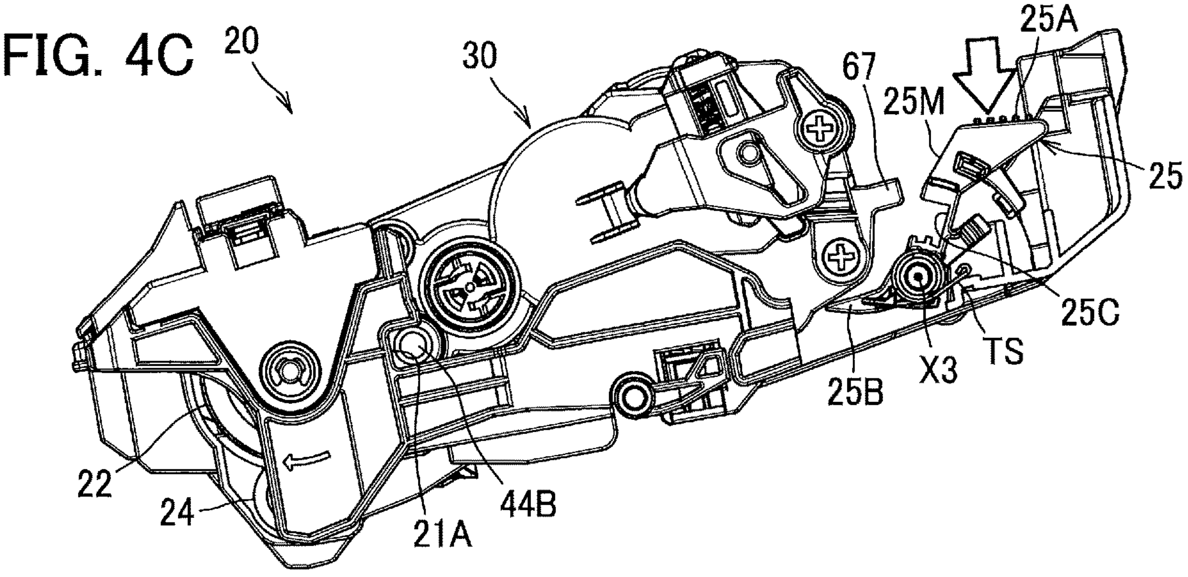
FIG. 4C is a view for description of the detachment of the toner cartridge from the drum cartridge, and particularly illustrating a state where the toner cartridge is detached from the drum cartridge.

As the lock lever 25 is depressed further downward, the lifter portion 25B of the lock lever 25 pushes up the toner cartridge 30 as illustrated in FIG. 4C. Since the lifter portion 25B lifts up the toner cartridge 30 from the drum frame 21, detachment of the toner cartridge 30 from the drum cartridge 20 can be facilitated.

Figure 11:
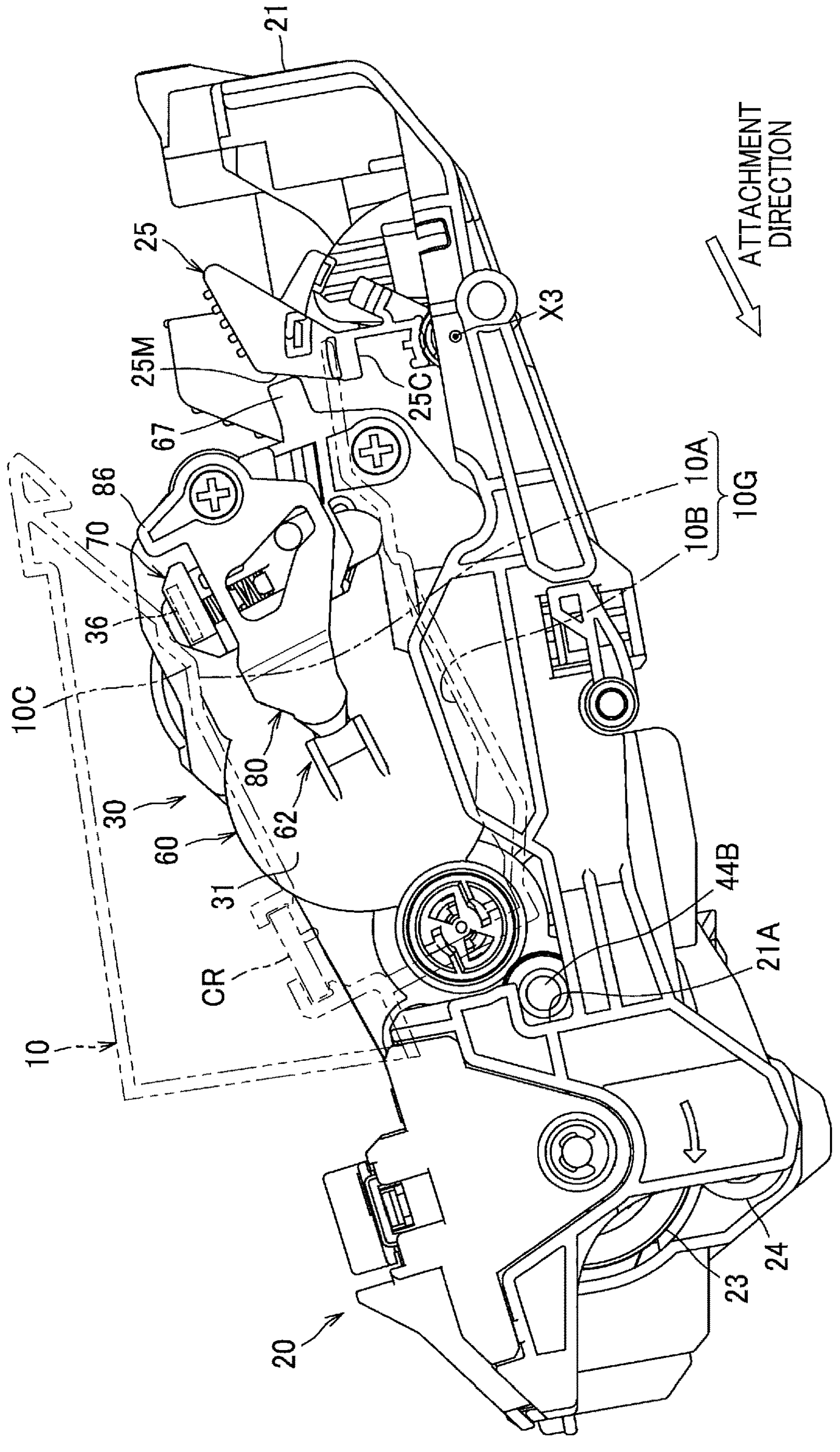
FIG. 11 is a view for description of a process to attach the drum cartridge to a housing of the image forming apparatus while the toner cartridge is in a half-inserted state relative to the drum cartridge, and particularly illustrating a state before a protrusion of the toner cartridge comes into contact with a contacting portion of the housing.
Figure 12:
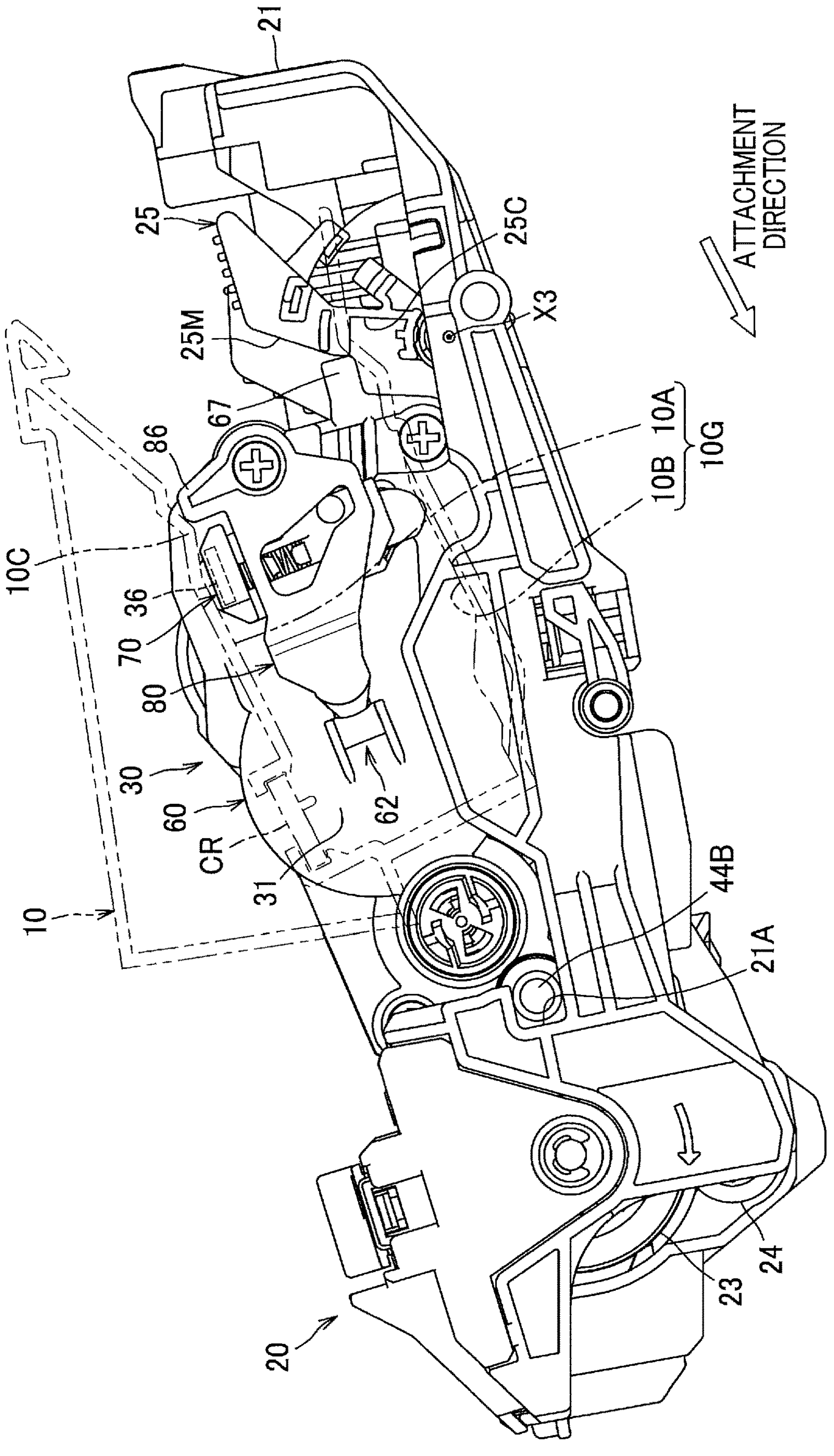
FIG. 12 is a view for description of the process to attach the drum cartridge to the housing while the toner cartridge is in its half-inserted state relative to the drum cartridge, and particularly illustrating a state where the protrusion of the toner cartridge starts contacting the contacting portion of the housing.
Figure 13:
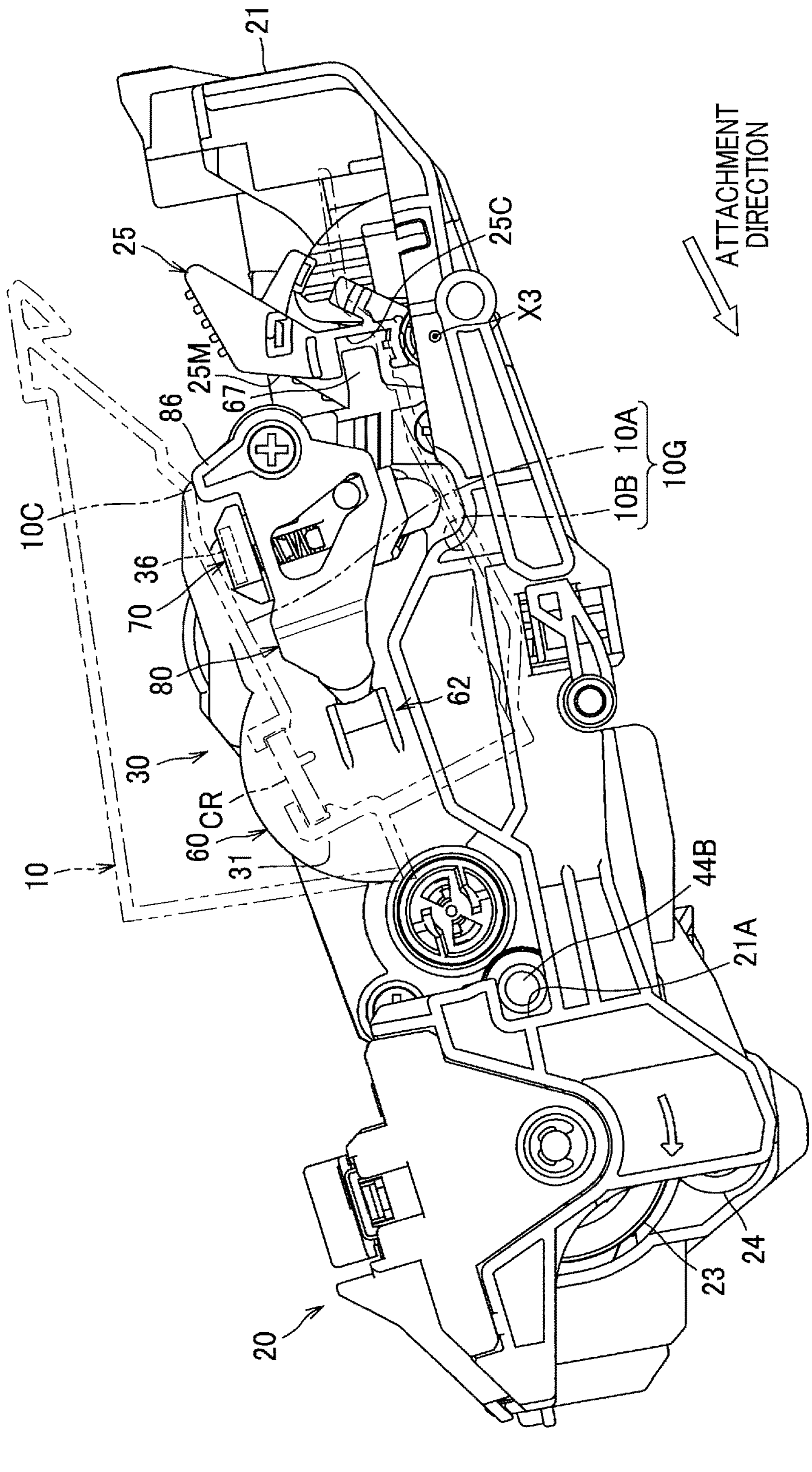
FIG. 13 is a view for description of the process to attach the drum cartridge to the housing while the toner cartridge is in its half-inserted state relative to the drum cartridge, and particularly illustrating a state where the toner cartridge is locked to the drum cartridge by the contact of the protrusion with the contacting portion.

Next, a process to attach the drum cartridge 20 to the housing 10 in a state where the toner cartridge 30 is in the half-insertion state relative to the drum cartridge 20 will be described with reference to FIGS. 11 through 13. In FIGS. 11 through 13, a part of the drum frame 21 and the handle HD of the toner cartridge 30 are not illustrated.

Here, in the housing 10, the upper guide surface 10A has a contacting portion 10C. The contacting portion 10C is positioned at a side wall of the housing 10, the side wall being positioned at one end portion of the housing 10 at the one side in the first direction. The contacting portion 10C is configured to contact the protrusion 86 of the toner cartridge 30 in a case where the drum cartridge 20 with the toner cartridge 30 in the half-insertion state is attached to the housing 10. The contacting portion 10C is a part of the upper guide surface 10A. The contacting portion 10C is a protruding portion of the upper guide surface 10A protruding toward the lower guide surface 10B.

As illustrated in FIG. 11, the locking protrusion 67 of the gear cover 60 is not entered into the locking portion 25C of the lock lever 25 in the drum cartridge 20 where the toner cartridge 30 is in the half-insertion state. That is, the toner cartridge 30 is not locked to the drum cartridge 20 by the lock lever 25.

As the drum cartridge 20 is moved slightly in the attachment direction from the state illustrated in FIG. 11, the protrusion 86 of the memory holder cover 80 comes into contact with the contacting portion 10C of the guide groove 10G, as illustrated in FIG. 12. Accordingly, the toner cartridge 30 is depressed toward the drum cartridge 20, and the locking protrusion 67 is moved to approach the drum cartridge 20. As the locking protrusion 67 moves toward the drum cartridge 20, the locking protrusion 67 pushes the abutment surface 25M of the lock lever 25, thereby moving the lock lever 25 toward the unlocking position.

As the drum cartridge 20 is moved further in the attachment direction from the state illustrated in FIG. 12, the protrusion 86 comes into contact with a tip of the contacting portion 10C, as illustrated in FIG. 13. Accordingly, the toner cartridge 30 is further pushed toward the drum cartridge 20, and the locking protrusion 67 moves into the locking portion 25C. In this way, the half-insertion state of the toner cartridge 30 is resolved, and the toner cartridge 30 is fully attached to the drum cartridge 20.

Thereafter, as the drum cartridge 20 is further moved in the attachment direction, the protrusion 86 moves past the contacting portion 10C, and is separated from the upper guide surface 10A. In this way, in a case where the drum cartridge 20 is attached to the housing 10 while the toner cartridge 30 is at a position lifted up rather from the attachment position with respect to the drum cartridge 20 (i.e., the toner cartridge 30 is in the semi-insertion state), the toner cartridge 30 can move from the lifted position (semi-insertion state) to the attachment position (fully attached state) by the contact of the protrusion 86 with the contacting portion 10C.

With the above-described structure according to the embodiment, the following technical advantages can be obtained.

In the above-identified conventional structure, two screws, which were inserted from the inner surface of the gear cover, must be removed to replace the memory holder holding the toner memory with a new memory holder. Therefore, troublesome labor is required for the exchange of the toner memory. In contrast, in the toner cartridge 30 according to the present disclosure, the memory holder cover 80 is fixed to the gear cover 60 by inserting the pawl 81 of the memory holder cover 80 into the hook 62 of the gear cover 60. Hence, work for assembling the memory holder 70 holding the toner memory 36 can be facilitated in comparison with the conventional structure, and the labor required to replacement of the toner memory 36 can be reduced.

Specifically, in the toner cartridge 30, the memory holder 70 can be easily replaced with a new memory holder by unfastening, from the outside of the memory holder cover 80, the single screw 80N inserted from the outside of the gear cover 60 without detachment of the gear cover 60 from the toner casing 31. As a result, the labor required for replacement of the toner memory 36 can be reduced in recycling of the toner cartridge 30.

Further, the memory holder cover 80 is securely fixed to the gear cover 60 by means of the screw 80N screwed into the gear cover 60. Further, in the toner cartridge 30 according to the present embodiment, assembly of the memory holder 70 can be facilitated since the memory holder cover 80 is fixed to the gear cover 60 by the single screw 80N inserted from the outer surface of the gear cover 60.

Further, the memory holder cover 80 has the boss hole 82 in which the boss 63 of the gear cover 60 is inserted. Hence, positioning of the memory holder cover 80 relative to the gear cover 60 can be facilitated.

Further, in the state where the memory holder cover 80 is fixed to the gear cover 60, the pawl 81 of the memory holder cover 80 is in contact with the connecting portion 62C of the hook 62. With this structure, displacement of the pawl 81 in the first direction toward the one side can be restricted.

Further, the memory holder cover 80 has the sloped surface 83 that is inclined toward the one side in the first direction as extending away from the developing roller 32. With this structure, the sloped surface 83 can restrain the toner cartridge 30 from being caught in the attachment path during the attachment of the toner cartridge 30 to the housing 10 of the image forming apparatus 1.

In the drum cartridge 20 according to the present disclosure, the protrusion 86 of the toner cartridge 30 comes into contact with the contacting portion 10C of the housing 10 in a case where the drum cartridge 20 is attached to the housing 10 while the toner cartridge 30 is at a position lifted up from the drum frame 21 rather than the attached position (i.e., while the toner cartridge 30 is in the semi-insertion state). Accordingly, the toner cartridge 30 can move from the lifted-up position to the fully attached position relative to the drum frame 21. That is, according to the drum cartridge 20 of the present disclosure, the semi-insertion state of the toner cartridge 30 relative to the drum cartridge 20 can be eliminated through the attachment of the drum cartridge 20 to the housing 10, thereby enabling a proper image forming operation to be performed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the second direction is perpendicular to the first direction. However, the second direction need not be perpendicular to the first direction. Further, in the above-described embodiment, the second direction is coincident with the attachment direction of the drum cartridge 20. However, the second direction may be different from the attachment direction of the drum cartridge 20.

In the above-described embodiment, the protrusion 86 protrudes in the third direction which is an example of a direction crossing the first direction. However, the protrusion 86 may protrude in a direction different from the third direction. In this case, the contacting portion at the side wall of the housing 10 may be positioned to face the protrusion protruding in the direction different from the third direction.

In the above-described embodiment, the toner memory 36 is an integral unit incorporating the electrical contact surface and a memory element. However, each of the electrical contact surface and the memory element may be configured as a discrete member. In this case, the electrical contact surface may be electrically connected to the memory element through a harness, for example.

In the depicted embodiment, the monochromatic printer is exemplified as an image forming apparatus of the present disclosure. However, the present disclosure may be applicable to an image forming apparatus other than the monochromatic printer, such as a color printer, a copying machine, and a multifunction device.

Each part and component described in the embodiment and modifications thereof may be suitably combined together.

[Remarks]

The toner cartridge 30 is an example of a toner cartridge of the disclosure. The toner casing 31 is an example of a toner casing. The toner memory 36 is an example of a toner memory. The memory holder 70 is an example of a memory holder. The memory holder cover 80 is an example of a memory holder cover 80. The coupling 51, the developing gear 52, the supply gear 53, the agitator gear 54, and the idle gear 55 are examples of a gear. The gear cover 60 is an example of a gear cover. The pawl 81 is an example of a pawl of the memory holder cover. The hook 62 is an example of a hook of the gear cover. The screw 80N is an example of a screw. The boss 63 is an example of a boss of the gear cover. The boss hole 82 is an example of a hole of the memory holder cover. The first rib 62A is an example of a first rib of the hook. The second rib 62B is an example of a second rib of the hook 62. The connecting portion 62C is an example of a connecting portion of the hook. The developing roller 32 is an example of a developing roller. The developing roller axis X4 is an example of a developing roller axis. The sloped surface 83 is an example of a sloped surface of the memory holder cover. The agitator 35 is an example of an agitator. The agitator axis X6 is an example of an agitator axis.

What is claimed is:

1. A toner cartridge comprising:

a toner casing configured to accommodate toner therein;

a toner memory;

a memory holder holding the toner memory;

a memory holder cover movably holding the memory holder, the memory holder cover having a pawl;

a gear positioned at an outer surface of the toner casing; and a gear cover positioned at one end portion of the toner casing in a first direction, the gear cover covering at least a part of the gear and having a hook in which the pawl is inserted; and a screw fixing the memory holder cover to the gear cover, wherein the gear cover has a boss protruding outward in the first direction, and wherein the memory holder cover has a hole in which the boss is inserted.

2. The toner cartridge according to claim 1, wherein the pawl, the screw, and the hole are arrayed with one another.

3. The toner cartridge according to claim 2, wherein the hook comprises:

a first rib;

a second rib positioned apart from the first rib in a second direction crossing the first direction; and a connecting portion connecting the first rib and the second rib together, and wherein the pawl is in contact with the connecting portion.

4. The toner cartridge according to claim 1, further comprising a developing roller rotatable about a developing roller axis extending in the first direction, wherein the memory holder cover has a sloped surface inclined to protrude outward in the first direction as extending away from the developing roller.

5. The toner cartridge according to claim 1, further comprising an agitator positioned inside the toner casing and configured to agitate the toner, the agitator being rotatable about an agitator axis extending in the first direction, wherein the gear is positioned at one end of the agitator in the first direction.

6. A toner cartridge comprising:

a toner casing configured to accommodate toner therein:

a toner memory;

a memory holder holding the toner memory;

a memory holder cover movably holding the memory holder, the memory holder cover having a pawl;

a gear positioned at an out surface of the toner casing; and a gear cover a gear cover positioned at one end portion of the toner casing in a first direction, the covering at least a part of the gear and having a hook in which the pawl is inserted, wherein the memory holder is movable relative to the memory holder cover in a second direction crossing the first direction and in a third direction crossing the first direction and the second direction.

* * * * *